US008315583B2

(12) United States Patent
Stelliga et al.

(10) Patent No.: US 8,315,583 B2
(45) Date of Patent: Nov. 20, 2012

(54) PRE-CONFIGURATION AND CONTROL OF RADIO FREQUENCY NOISE CANCELLATION (75) Inventors: David Anthony Stelliga, Santa Clara, CA (US); Wilhelm Steffen Hahn, Los Altos, CA (US)

(73) Assignee: Quellan, Inc., Atlanta, GA (US)

( * ) Notice: Subject to any disclaimer, the term of this patent is extended or adjusted under 35 U.S.C. 154(b) by 1156 days.

(21) Appl. No.: 12/177,099

(22) Filed: Jul. 21, 2008

(65) Prior Publication Data
US 2009/0016545 A1 Jan. 15, 2009

Related U.S. Application Data (63) Continuation-in-part of application No. 11/509,112, filed on Aug. 23, 2006, now Pat. No. 7,804,760.

(51) Int. Cl.
H04B 15/00 (2006.01)

(52) U.S. Cl. ........................................ 455/296; 455/299

(58) Field of Classification Search .................. 455/295, 455/296, 297, 299, 303, 304, 305, 307, 310; 375/295, 296, 349, 350, 351; 381/71.2, 71.8
See application file for complete search history.

(56) References Cited

U.S. PATENT DOCUMENTS

| | | | |
|---|---|---|---|
| 4,499,606 A * | 2/1985 | Rambo | 455/297 |
| 4,878,188 A | 10/1989 | Ziegler, Jr. et al. | |
| 5,251,262 A | 10/1993 | Suzuki et al. | |
| 5,606,734 A * | 2/1997 | Bahu | 455/303 |
| 5,727,072 A | 3/1998 | Raman | |
| 6,091,366 A | 7/2000 | Zhang | |
| 6,385,435 B1 | 5/2002 | Lee | |
| 7,035,388 B2 | 4/2006 | Kurosaki | |
| 7,050,388 B2 | 5/2006 | Kim | |
| 7,123,676 B2 | 10/2006 | Gebara | |
| 7,173,551 B2 | 2/2007 | Vrazel | |
| 7,215,721 B2 | 5/2007 | Heitala | |
| 7,366,244 B2 | 4/2008 | Gebara | |
| 2002/0167693 A1 | 11/2002 | Vrazel | |
| 2002/0196510 A1 | 12/2002 | Hietala | |
| 2004/0012433 A1 | 1/2004 | Kim | |
| 2004/0151238 A1 | 8/2004 | Masenton | |
| 2004/0213354 A1 | 10/2004 | Jones | |
| 2005/0030884 A1 | 2/2005 | Kim | |
| 2005/0254664 A1 | 11/2005 | Kwong et al. | |
| 2007/0060059 A1 | 3/2007 | Kim | |
| 2007/0064923 A1 | 3/2007 | Schmukler | |
| 2009/0016545 A1 | 1/2009 | Stelliga | |

OTHER PUBLICATIONS

International Search Report, PCT/US2009/051208, Sep. 8, 2009.

* cited by examiner

Primary Examiner — Thanh Le
(74) Attorney, Agent, or Firm — King & Spalding (57) ABSTRACT A noise-reduction system includes a noise-pattern predictor in communication with a noise-canceling module. In a more specific embodiment, the noise-reduction apparatus further includes an input collector in communication with the noise-pattern predictor. The input collector is coupled to a first module, such as a sensor, that provides information to the noise-pattern predictor to facilitate predicting noise in an accompanying signal environment and to provide a first signal in response thereto. In an illustrative embodiment, the first signal includes information indicating when an ignition system of a vehicle will turn on. The first signal further includes information indicating when a second signal transmitted from a cellular base station will affect noise in the signal environment. The second signal may include a burst in a cellular signal.

30 Claims, 5 Drawing Sheets

PRE-CONFIGURATION AND CONTROL OF RADIO FREQUENCY NOISE CANCELLATION

REFERENCE TO RELATED APPLICATIONS

This application is a continuation-in-part of U.S. patent application Ser. No. 11/509,112 filed on Aug. 23, 2006, entitled "Method and system for signal emulation" which is hereby incorporated by reference as if set forth in full in this application for all purposes.

BACKGROUND OF THE INVENTION

This disclosure relates generally to noise reduction or cancellation and more specifically to pre-configuring and controlling a noise cancellation circuit.

Noise cancellation systems are becoming increasingly important and vital to the proper functioning of various devices such as cell phones, personal digital assistants (PDAs), Global Positioning System (GPS) systems; computer systems, video game consoles, and so on. As devices become smaller and include multiple sources of noise such as Bluetooth, 802.11x, GPS or other digital or analog transceivers; display screens, clocks, power switching, etc., the ability to provide fast and effective noise cancellation can become vital. Today's applications often demand power-efficient noise canceling systems that can quickly reduce or eliminate undesirable signals, such as Radio Frequency (RF) noise and interference, in accompanying system components.

Effective noise canceling systems are particularly important in wireless applications, such as cellular telephones, where radio interference may cause dropped calls, loss of data, or other non-performance effects. A noise canceling system may measure noise in a signal environment and then output a signal designed to cancel the noise. The faster that the noise cancellation subsystem can converge on the noise signal (i.e., generate a matching signal to cancel the noise signal) the more effective is the noise cancellation. Also, power consumption is always an important aspect of circuitry in a portable device, so it is desirable to make the generation and application of the noise cancellation signal as power-efficient as possible.

DETAILED DESCRIPTION OF EXAMPLE EMBODIMENTS

An example noise-reduction apparatus includes a noise-pattern predictor and a noise-canceling module that is coupled to the noise-pattern predictor.

In an illustrative embodiment, a pre-configuration signal is generated in response to an advance signal. An advance signal can be any signal that indicates a future occurrence of a characteristic of an interference signal on a target circuit. For example, a signal to start a car (e.g., key turning in an ignition, automatic ignition start signal generated by a processor in the car, driver activation of a control such as a button press to start the car, etc.) can each be used as an advance signal to indicate that interference signals will be produced imminently by the engine starter motor turning, spark plugs firing, car subsystems (e.g., AM/FM radio, satellite radio, GPS navigation, etc.) turning on, or other interference signals that may be energized by the car being started.

Another type of advance signal can be derived without direct reaction to a physical event. If an interference signal is known to be generated at a specific time, or at known intervals, then a corresponding timed or periodic advance signal can be used to indicate that an interference signal will be issued at a known time or at known intervals. For example, a cell phone transmission station may use periodic "keep alive" signals, registration signals, or other periodic signals to maintain connectivity between a cell phone and the transmission station. A periodic advance signal can be generated by a pre-configuration system and used to configure a noise cancellation system in advance of the noise property or characteristic to be cancelled.

For the purposes of the present discussion, noise may be any signal that is undesirable for any given reason. For example, electromagnetic noise may be any electromagnetic signal that is undesirable for the operation of a given device, apparatus, or system, such as a circuit. Examples of noise include, but are not limited to, interference due to thermally induced electric currents, signal disturbances resulting from inductive coupling between circuit conductors, undesirable electromagnetic radiation, such as Radio Frequency (RF) interference, conducted interference via supply or control lines, and so on.

A noise-pattern predictor may be any circuit, process, mechanism or other system that is adapted to predict a characteristic of noise based on one or more predetermined patterns or other preexisting data. For example, a device that predicts a frequency or delay of noise based on knowledge that a noise source produces interference characterized by a given frequency may be considered a type of noise-pattern predictor. As another example, a device that predicts that interference caused by a Bluetooth signal will reach a certain intensity on a particular frequency channel during a given time interval based on knowledge that the Bluetooth signal will reach maximum intensity approximately every thirty seconds may also be considered a type of noise-pattern predictor.

A noise-canceling system, device, or module may be any system that is adapted to cancel, reduce, or lower, noise levels or to otherwise mitigate the impact of a characteristic of an undesired signal on another target circuit, signal environment or other entity. A signal environment may be any space or region in which or through which signals are transferred. Examples of noise canceling systems may be found, for example, in patents and patent applications assigned to Quellan, Inc., such as those referenced at the beginning of this document.

Figure 1:
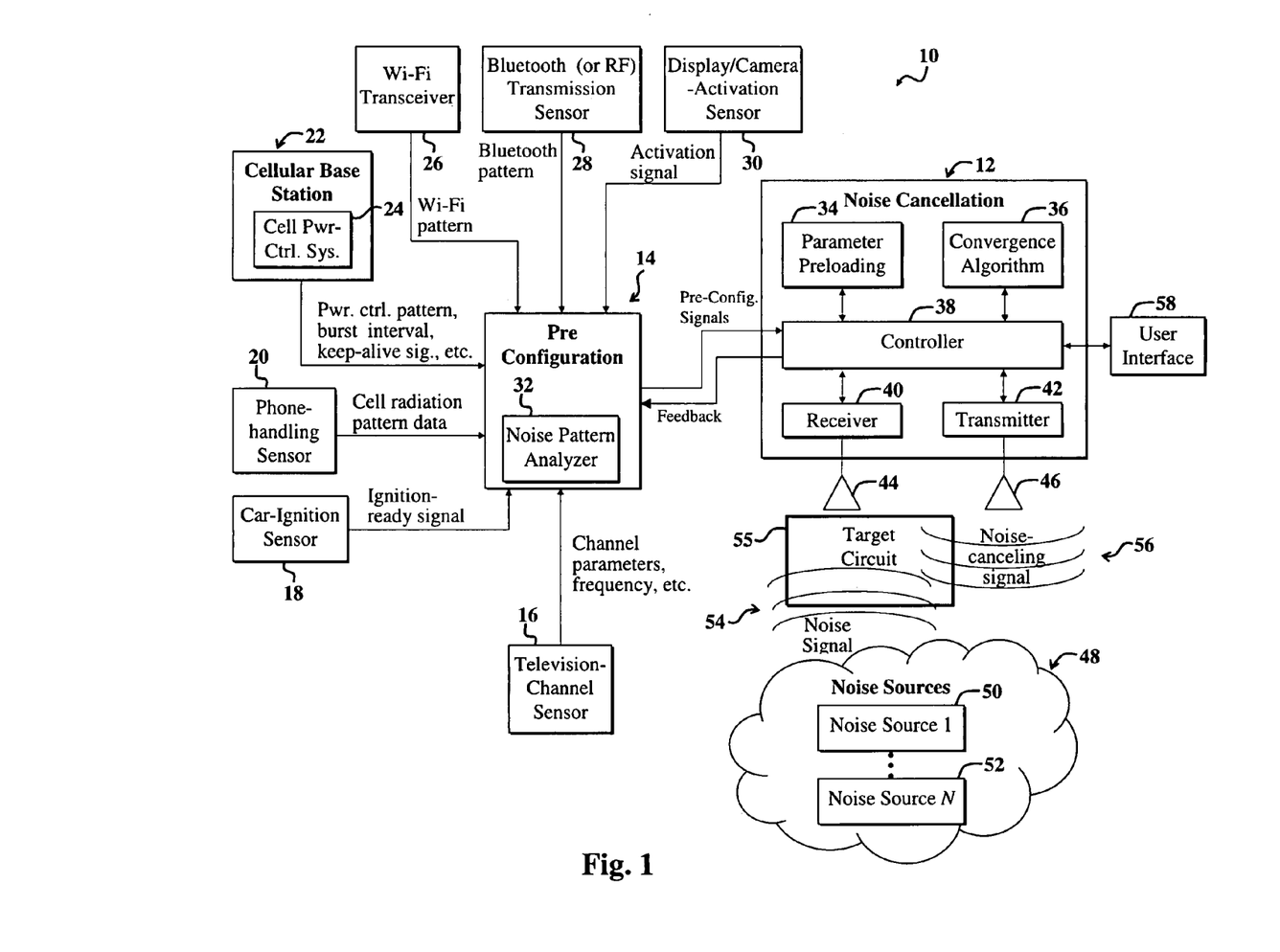
FIG. 1 illustrates a first example noise-canceling system that wirelessly transmits a noise-canceling signal.

FIG. 1 illustrates a first example noise-canceling system 10. The system 10 includes a noise-cancellation module 12 in communication with pre-configuration module 14 and with an accompanying noise-pattern analyzer 32. Pre-configuration module 14 may accept input from any number and type of external systems that can provide an advance signal, or from which an advance signal may be derived. For example, FIG. 1 shows external systems such as television channel sensor 16, a car-ignition sensor 18, a phone-handling sensor 20, a cellular base station 22 with a power-control system 24, a Wi-Fi transceiver 26, a Bluetooth transmission sensor 28, and a display-activation sensor 30. Such sensors can be designed into or provided to interface with their respective systems to provide a predetermined type of advance signal. In other cases, pre-configuration module 14 can sense signals or behavior associated with an external system that is known to trigger a noise source, and use the associated trigger signal as an advance signal. For example, if a cell phone is known to generate a particular internal signal prior to transmission of a high energy radio frequency signal that causes interference with a target circuit, then the particular internal signal can be used as the advance signal or can be used to derive an advance signal.

Advance signals can be conveyed in any manner as, for example, by wired or wireless (radio frequency, infrared, etc.), optical, mechanical, etc., communications. Advance signals can be designed into products or systems by the product manufacturers according to a protocol, standard or other format that is agreed-upon by the product manufacturer with the noise cancellation module manufacturer. In other cases, advance signals may be detected or learned from monitoring the behavior of products and, in this manner, would not need the cooperation of product manufacturers in order to implement the pre-configuration features described herein.

The noise-cancellation module 12 includes a controller 38 in communication with a parameter-preloading module 34, a convergence algorithm 36, a receiver 40, and a transmitter 42. The parameter-preloading module 34 and the convergence algorithm 36 may be incorporated within the controller 38 without departing from the scope of the present teachings. In general, processes and functions described herein may be performed at different locations and at different times without departing from the scope of the invention, unless otherwise noted. For example, parameters can be stored and loaded from pre-configuration module 14. In this type of operation, pre-configuration module 14 can use one or more advance signals to determine which parameters to transfer to controller 38 to optimally configure controller 38 for a particular type of expected noise cancellation.

Pre-loading of coefficients is one type of pre-configuration action that can be taken in response to an advance signal. Power-related pre-configuration actions include powering on circuitry that has been powered off or providing more power to circuitry that is in a low-power state such as a standby or idle state. Processing-related pre-configuration includes pre-loading coefficients or otherwise providing parameters, values, initial states or other information that assists a noise-canceling circuit to converge on a noise canceling signal. Noise or signal characteristics can include energy, phase, frequency, amplitude or other information. A state of a signal being present or not (i.e., transmission of a signal) is considered a "characteristic" of the signal, as is the signal's intensity, change over time, or other derivatives or properties of the signal. Resource-related pre-configuration includes allocating system resources such as processor cycles, memory or bus utilization, etc., to routines or functions that deal with noise cancellation in order to prepare a noise cancellation module to better react to an incoming noise characteristic.

In some embodiments, noise cancellation system 12 can provide feedback to pre-configuration system 14 as shown by the feedback signal in FIG. 1. Feedback from the noise cancellation system to the pre-configuration system can improve subsequent pre-configuration performance. For example, if is determined that particular coefficients are optimal to converge on a noise source, that information can be transferred to the pre-configuration system for later transmission to the noise cancellation system when the noise source advance signal is detected later. If the noise cancellation system determines that it needs a different amount of advance time in order to more effectively pre-configure its system this can be requested via a feedback signal so that the pre-configuration system can adjust timing, if possible, to provide an earlier or later notification of an advance signal. Other variations are possible as pre-configuration can be utilized to compensate for signal variations caused by conditions or criteria sensed at the noise cancellation system such as temperature, humidity, the changing existence or dynamically varying distance of an interference source, power conditions, etc.

A user interface 58 is coupled to the controller 38 and may enable a user to adjust the operation of the noise-cancellation module 12. Although a preferred embodiment anticipates automated pre-configuration and control, other embodiments can allow a user to configure pre-configuration operations. For example, a user may turn pre-configuration functions on or off for specific types of noise sources or advance signals. A user may specify the type of pre-condition steps to take. In some cases a system may be reacting to advance signals associated with noise signals that actually produce no interference effect upon a user's device and a user can use a user interface control (e.g., button press, menu selection, etc.) to disable the inconsequential pre-configuration actions. A user may set forced pre-configuration conditions such as to give high priority or high resources to pre-configuration activities upon the occurrence of a user control activation or a predetermined event.

The noise-canceling system 10 is positioned in a signal environment that includes various noise sources 48, including a first noise source 50 and an Nth noise source 52. Typically, a noise source will be associated with and in proximity to a source of its associated advance signal such as where a transmitter's sensor sends an advance signal just prior to transmitting. However, other examples of noise sources and advance signals can allow different scenarios such as where an advance signal is generated at a remote location from the source of noise. This may be the case where a remote control is used to control another device such as a television. In this case, the remote control can send a "tv power on" advance signal by wireless signal to all other devices in the room so that the noise cancellers in the other devices can be pre-configured to cancel noise from the television.

The receiver 40 and transmitter 42 are equipped with a first antenna 44 and a second antenna 46, respectively. In operation, the noise cancellation module 12 transmits a noise-canceling signal 56 via the transmitter 42 and accompanying antenna 46. The noise-canceling signal 56 is designed to cancel noise 54 emanating from the various noise sources 48.

Examples of potential signal noise sources include television signal transmissions, automobile ignition systems, cellular telephones, cellular base stations, Wi-Fi transceivers, Bluetooth transceivers, computer displays, and so on. Certain information pertaining to such noise sources is provided to the pre-configuration module 14 via the television-channel sensor 16, the car-ignition sensor 18, the phone-handling sensor 20, the cellular base station 22, the Wi-Fi transceiver 26, the Bluetooth transmission sensor 28, and the display-activation sensor, respectively. Such information may include television channel parameters, such as frequency and signal strength; information, which may be provided via an ignition-ready signal, indicating when an ignition system of a vehicle is about to turn on; information indicating a radiation pattern associated with a particular cellular telephone; information pertaining to cellular signal transmission patterns from a cellular base station, such as information indicating when keep-alive signals are broadcast to a cellular telephone, when power-control signals are sent to a cellular telephone, and signal power levels; information indicating when a Wi-Fi transceiver will transmit a signal and the corresponding signal strength; information indicating when a Bluetooth device will transmit a given Bluetooth signal; information indicating when a display screen is about to be activated; and so on, respectively.

The pre-configuration module 14 may relay information pertaining to sensed signal characteristics, pertaining to various types of signals occurring in the signal environment, to the noise-cancellation module 12. Sensed signal characteristics may include static or dynamic signal pattern or timing information, signal strength, frequency, and so on. Alternatively, instead of or in addition to relaying sensed signal characteristics to the noise-cancellation module 12, the input collector 32 may employ the noise-pattern analyzer 32 to analyze noise patterns based on inputs from the various modules 16-30. For example, the noise-pattern analyzer 32 may implement instructions for estimating existing noise levels and/or predicting or estimating how noise levels in the signal environment will change in time. A resulting noise prediction may be input to the noise-cancellation module 12 to accelerate convergence of the noise-cancellation module 12 to the desired noise-canceling signal 56.

Note that the signal characteristics input to the pre-configuration module 14 may include other information, not just sensed signal characteristics. For example, predetermined information other than sensed information may be provided. An example of such predetermined information includes predetermined Bluetooth transmission pattern and/or frequency information.

Pre-configuration module 14 may merely pass advance signals or other received signals to the noise cancellation module and the noise cancellation module can take appropriate action, such as to activate or power-up circuitry or processes for noise cancellation, load needed coefficients or allocate resources. Alternatively, pre-configuration module 14 can perform pre-processing operations to assist the noise cancellation module in pre-configuration, such as those described above. Depending upon the implementation, pre-configuration circuitry can be integrated with noise cancellation circuitry for possible efficiencies. Multiple pre-configuration modules or operations can be used that can perform operations in parallel.

The controller 38 receives a signal from the pre-configuration module 14. The signal may indicate predetermined noise patterns and may contain predictive information that enables the controller 38 to estimate when noise in the signal environment will exhibit certain characteristics, such as certain intensity, frequency, and so on. Alternatively, the signal provided by the input collector 32 to the controller 38 may include an estimate of future noise levels or characteristics based on computations performed by the noise-pattern analyzer or predictor 32.

For example, in the present illustrative embodiment, the Bluetooth transmission sensor 28 may also sense Radio Frequency (RF) signals in the present embodiment. The transmission sensor 28 may provide a signal to the pre-configuration module 14 indicating when a given RF signal or Bluetooth signal has been detected. The noise-pattern analyzer 32 may employ predetermined pattern information indicating that surges in the RF signal occur every tenth of a second and that surges in a detected Bluetooth signal occur 30 times per second to effectively predict noise patterns. These noise patterns may then be readily employed by the noise-cancellation module 12 to improve generation and timing of the noise-canceling signal 56 used to cancel the noise generated by the Bluetooth and RF signals.

Additional or different sensors (other than modules 16-30) for providing additional or different information about a signal environment to the noise-canceling module 12 may be employed without departing from the scope of the present teachings. For example, a General Packet Radio Service (GPRS) sensor could be used to sense when a GPRS signal is detected in the signal environment. The noise-pattern analyzer 32 could determine that the GPRS signal is transmitted once every one hundred seconds, for example. The noise-pattern analyzer 32 may then transfer the corresponding pattern and timing information to the noise-cancellation module 12 to facilitate canceling noise in the signal environment caused by the GPRS signal.

As another example, the power-control system 24 at the cellular base station 22 may transmit a power-control signal that is detected by the pre-configuration module 14. The noise-pattern analyzer 32 may include instructions for determining, for example, that the power-control signal is a Global System for Mobile communications (GSM) power-control signal that instructs the transmitter of a cellular telephone in the signal environment to reduce its power or to transmit a burst. Knowledge that an associated cellular telephone may soon transmit at a lower power level or at a higher power level may be employed by the noise-cancellation module 12 to more quickly make corresponding adjustments to the noise-canceling signal 56.

As another example the noise-pattern analyzer 32 may be equipped to detect and analyze undesired harmonics from clock or data signals in the signal environment. This information may then be employed by the noise-cancellation module 12 to facilitate generating the noise-canceling signal 56.

The phone-handling sensor 20 may sense when a cellular telephone equipped with the noise-cancellation module 12 is being handled by a user. Generally, the radiation pattern output by a transmitter of a cellular telephone changes when the cellular telephone is being handled. This change in radiation pattern may affect noise in the signal environment that affects the operation of the cellular telephone. Information indicating how the radiation pattern of the cellular telephone changes when the cellular telephone is handled may be employed by the noise-pattern analyzer 32 facilitate predicting resulting noise characteristics. Such predicted noise characteristics may be employed by the controller 38 to help generate effective parameters to facilitate the operation of the convergence algorithm 36.

The television-channel sensor 16 may sense when a channel on a television is changed or about to be changed. The noise-pattern analyzer 32 may maintain predetermined knowledge indicating how noise in the signal environment changes based on which television channel a given television is set to. This information may be provided to the noise-cancellation module 12 as needed to improve the noise-canceling signal 56 and/or to improve the rate at which the convergence algorithm 36 converges to the accurate noise-canceling signal 56.

While in the present embodiment, the pre-configuration module 14 and noise-pattern analyzer 32 are shown implemented separately from the noise-cancellation module 12, those skilled in the art will appreciate that the pre-configuration module 14 and noise-pattern analyzer 32 may be incorporated within the noise-cancellation module 12. Furthermore, the noise-pattern analyzer 32 may be implemented as a separate module outside of the pre-configuration module 14. In addition, various modules, such as the parameter-preloading module 34 and convergence algorithm 36 may be implemented within the controller 38 or elsewhere without departing from the scope of the present teachings. Furthermore, certain modules may be omitted. For example, the parameter preloading module may be implemented via another mechanism that facilitates improving the ability of the noise-cancellation module 12 to cancel the noise 54 based on predetermined knowledge of the signal environment.

The controller 38 includes instructions to implement various functions. For example, in one operative scenario, the controller 38 receives a signal from the pre-configuration module 14, which provides information pertaining to the noise 54 that exists in the signal environment and/or is expected to exist in the signal environment. The controller 38 then employs the signal to generate predetermined parameters, which are stored in the parameter-preloading module 34. The convergence algorithm 36 uses the parameters to reduce the time required for the convergence algorithm 36 to calculate an effective noise-canceling signal 56. Certain parameters may act as seed values or initial values that help the convergence algorithm 36 quickly determine the effective noise-canceling signal 56.

Exact details of the parameters preloaded in the parameter-preloading module 34 are application specific. For example, in certain embodiments, the parameters may include coefficients of sine and cosine functions that describe electromagnetic waves that are components of an estimated electromagnetic noise signal. The convergence algorithm 36 may then use parameters from the parameter preloading module 34 to initialize calculations performed by the convergence algorithm 36 to determine the noise-canceling signal 56.

In the present illustrative embodiment, the calculations performed by the convergence algorithm 36 are also based on noise 54 received by the receiver 40 and antenna 44 of the noise-cancellation module 12. The received noise signal 54 is processed as needed by the controller 38 and provided to the convergence algorithm 36. The convergence algorithm 36 includes instructions for computing the noise-canceling signal 56 to cancel the noise 54 and then to make adjustments to the noise-canceling signal 56 as needed to minimize the measured noise 54. Hence, the convergence algorithm 36 implements a closed loop controller that is initialized by parameters from the parameter-preloading module 34 that account for predetermined knowledge about the signal environment and noise sources therein. The predetermined knowledge may be provided to the noise-cancellation module 12 via the various sensors and modules 14-32 in the signal environment.

Various existing control algorithms may be adapted for used with embodiments of the present invention. For example, an existing closed-loop noise-canceling control algorithm could be employed with minor modifications to implement the convergence algorithm 36. The minor modifications may include initializing the convergence algorithm 36 via parameters from the parameter-preloading module 34 rather than merely initializing the convergence algorithm 36 via initial measurements of the noise 54. Use of predetermined noise parameters may accelerate convergence of the convergence algorithm 36 to the effective noise-cancellation signal 56, which may reduce power consumption.

In addition, the power consumption of the noise-cancellation module 12 is further reduced by selectively powering-off various modules, such as the convergence algorithm 36, receiver 40, and transmitter 46, when noise beyond a predetermined intensity threshold, frequency, or other characteristic, is not present or will not soon be present in the signal environment. In such situations, the noise-cancellation module 12 is not needed, and consequently, certain modules therein are not powered-on.

The controller 38 may be adapted to power-on various modules of the noise-cancellation module 12 in response to a predetermined signal from the pre-configuration module 14. For example, in one operative scenario, if a car equipped with the car-ignition sensor 18 is about to turn on, the car-ignition sensor 18 sends an ignition-ready signal to the pre-configuration module 14. The pre-configuration module 14 then forwards a corresponding signal to the controller 38, thereby causing the controller 38 to power-on the various modules 34, 36, 40, 42 in the noise-cancellation module 12. The controller 38 then determines and provides certain parameters to the parameter-preloading module 34 based on expected noise or interference caused by the car-ignition system that is sensed by the car-ignition sensor 18. The parameters then initialize the convergence algorithm 36 to accelerate convergence of the convergence algorithm 36 to the desired noise-canceling signal 56.

The noise-canceling system 10 may be considered an apparatus for reducing or eliminating noise, wherein the apparatus 10 includes a first mechanism 14-32 for determining one or more characteristics of a noise source and providing a first signal in response thereto in advance of the production of noise by the noise source 48-52. The apparatus 10 further includes a second mechanism 12 for activating a convergence algorithm 36 based on the first signal. The first signal may be the signal output by the pre-configuration module 14 and/or may represent one or more of the signals output from the various sensors or modules 16-30.

For the purposes of the present discussion, a convergence algorithm may be any controller or associated algorithm that adjusts an output based on certain criteria. An example convergence algorithm adjusts a noise-canceling signal based on feedback indicative of how effective the noise-canceling signal was at canceling noise.

The first mechanism 14-32 of the apparatus 10 further includes a handling sensor that is adapted to indicate a predicted change in radiation pattern of a mobile communication device when the mobile communication device is handled by a user.

For the purposes of the present discussion, a mobile communication device may be any apparatus, module, or system that is adapted to communicate with another device via a wireless communication link. Examples of mobile communications devices include laptops equipped with Wi-Fi cards, wireless telephones, GPRS devices, and so on. A Wi-Fi device, such as a transmitter, receiver, or transmitter, may be any device that is constructed in accordance with or that is coupled to a device that is in compliance with Institute of Electrical and Electronics Engineers (IEEE) 802.11 standards.

The first mechanism 14-32 further includes a vehicle-ignition sensor 18 adapted to signal when a vehicle is about to turn on. The first mechanism 14-32 further includes a module 22, 24 adapted to signal when a specific signal from a cellular transmitter 22 is about to enter a signal environment associated with the apparatus 10. The first mechanism 14-32 includes a Wi-Fi transmitter 26, a Bluetooth transmission sensor 28 for indicating when a Bluetooth signal will affect a signal environment associated with the apparatus 10, a display-activation sensor 30 for signaling when a display will be powered on or otherwise activated, and so on. The second mechanism 12 includes third mechanism 32, 38 for determining a pattern of noise output or to be output by the noise source 48-52.

Alternatively, the noise-canceling system 10 may be considered an apparatus for affecting noise in a signal environment, wherein the apparatus 10 includes an pre-configuration module 14 for receiving a first signal other than noise, wherein the first signal indicates a predetermined characteristic of forthcoming noise in the signal environment. The apparatus 10 further includes a noise-canceling module 12 that is adapted to power-on in response to the first signal.

Alternatively, the noise-canceling system 10 may be considered an apparatus that includes an pre-configuration module 14 for receiving a first signal other than noise, wherein the first signal indicates a predetermined characteristic of forthcoming noise in the signal environment. The apparatus 10 further includes a noise-canceling module 12 that includes a convergence algorithm 36 that is responsive to the first signal to selectively initialize the convergence algorithm 36, wherein the convergence algorithm 36 is adapted to output a noise-canceling signal.

Alternatively, the noise-canceling system 10 may be considered an apparatus that includes an pre-configuration module 14; a noise pattern analyzer 32, 38 coupled to the pre-configuration module 14; and a noise-canceling module 12 coupled to the pre-configuration module 14.

Those skilled in the art with access to the present teachings may readily implement various modules disclosed herein without undue experimentation. Implementation details for each module are application specific. For example, certain applications may benefit from analog circuit implementations, while other embodiments may benefit from digital circuitry or a combination of analog and digital circuitry. In addition, certain modules or portions thereof may be implemented in software without departing from the scope of the present teachings. In general, certain modules and components discussed herein can be implemented in hardware, software, or via any device with processing ability or other requisite functionality.

Note that certain embodiments disclosed herein may be readily adapted to cancel noise in various signal environments. For example, the noise-cancellation module 12 and pre-configuration module 14 may be implemented within a cellular telephone to reduce electromagnetic interference that could interfere with calls or other cellular telephone operations.

In a more specific embodiment, the noise-reduction apparatus further includes an input collector that is coupled to the noise-pattern predictor. The input collector is coupled to a first module, such as a sensor. The first module is adapted to provide information to the noise-pattern predictor to facilitate predicting future noise in an accompanying signal environment and to provide a first signal in response thereto.

For the purposes of the present discussion, a burst may be any increase in energy of a signal. A signal may be any mechanism capable of conveying information or energy, or a signal may be the conveyed information itself. For example, an electromagnetic signal, such as a radio signal, may be the electromagnetic energy conveying the information or may be the information conveyed via the electromagnetic energy.

A keep-alive signal may be a signal sent from a first module to a second module to maintain a desired characteristic associated with the second module. An example of a desired characteristic includes a communications link between the first module and the second module or a power-on status of the second module.

An input collector may be any device, module, or system that can receive or collect input from one or more other devices, modules, or systems.

A noise-canceling signal may be any signal or transfer function or other mechanism that reduces noise in a second signal when applied thereto or that otherwise intends to reduce or eliminate noise in the second signal when applied thereto. A first signal is said to be applied to a second signal when it is added, subtracted, convolved, multiplied, divided, or otherwise used to affect the second signal. A transfer function may be any function or set of instructions characterizing the effects of a module on a signal input to the module. A transfer function may be applied to a signal or to another transfer function or parameter.

An example noise-reduction method includes receiving an input pertaining to a device that emits electromagnetic energy; estimating, based on the input, a characteristic of an emission of electromagnetic energy from the device and providing a first signal in response thereto; and employing the first signal to produce a cancellation signal for canceling or reducing the electromagnetic energy. In a more specific embodiment, the step of employing further includes initializing a noise cancellation algorithm to accelerate convergence of the noise-cancellation algorithm to a desired noise-cancellation signal. A cancellation signal may be any signal adapted to reduce or cancel another signal.

The novel design of certain embodiments discussed herein is facilitated by use of one or more external signals, such as signals other than merely noise measurements, to selectively power-on and initialize noise cancellation algorithms and/or accompanying devices, before the noise or a change in noise is produced or before noise cancellation is desired, thereby accelerating convergence to more quickly and efficiently eliminate or reduce noise in the signal environment.

Such embodiments may conserve power by only being powered-on when needed and by more quickly adapting to cancel or reduce interference in the signal environment. This may improve performance of other circuits in the signal environment. For example, a cellular telephone equipped with an embodiment discussed herein may exhibit fewer dropped calls due to less electromagnetic interference.

While certain embodiments are discussed herein with respect to a device for canceling electromagnetic noise, those skilled in the art may readily adapt certain embodiments herein to reduce or cancel other types of noise without departing from the scope of the present teachings and without undue experimentation.

For clarity, various well-known components, such as power supplies, amplifiers, and so on, have been omitted from the figures. However, those skilled in the art with access to the present teachings will know which components to implement and how to implement them to meet the needs of a given application.

Figure 2:
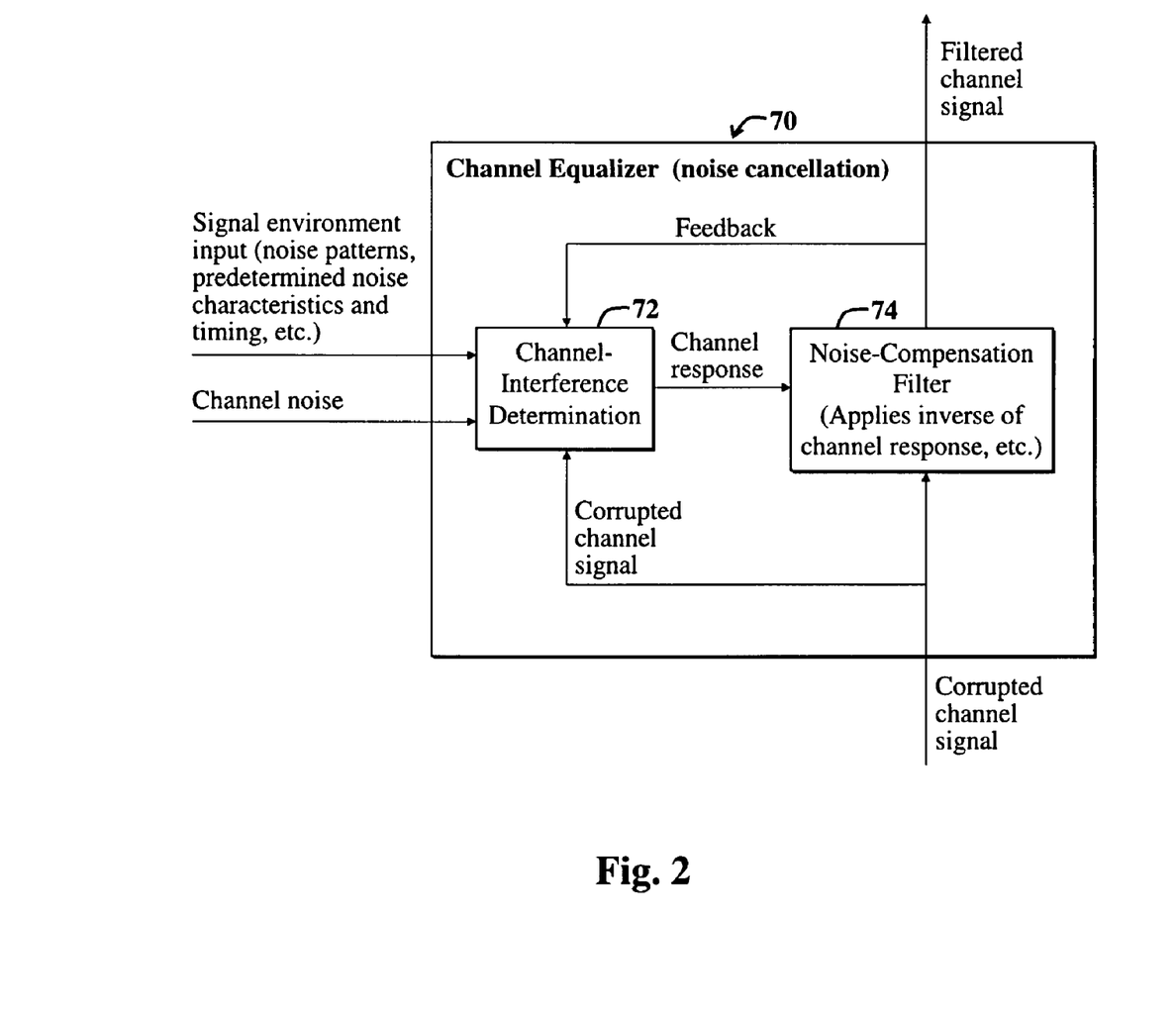
FIG. 2 illustrates a second example noise-canceling system that employs a noise-compensation filter to reduce or cancel noise in a signal environment.

FIG. 2 illustrates a second example noise-canceling system 70 that employs a noise-compensation filter 74 to reduce or cancel noise in a signal, such as a corrupted channel signal. The noise-canceling system 70, which may be considered a type of channel equalizer, includes a channel-interference determination module 72 in communication with a noise-compensation filter 74.

In operation, the modules 72, 74 receive a corrupted channel signal as input. A corrupted channel signal may be any signal that has been corrupted in passing through a channel or other signal environment.

The channel-interference determination module 72 further receives input from the signal environment in which the channel equalizer 70 is located. Such input may include noise patterns, predetermined characteristics of interference in the environment, and so on. For example, the channel-interference determination module 72 may receive input from the pre-configuration module 14 of FIG. 1 and/or from the various sensors and modules 16-30 of FIG. 1. The channel-interference determination module 72 may further receive a channel noise signal, which represents a measurement of existing noise in the signal environment.

The channel-interference determination module 72 includes instructions for determining an initial channel response indicative of the effects of noise on the signal that has been corrupted by the channel. The initial channel response is determined in part from the additional input from the signal environment and in part from any measured channel noise. The initial channel response is then provided to the noise-compensation filter 74. Alternatively, the initial channel response is based entirely on the additional input from the signal environment, such as input indicating when a surge in noise intensity will occur.

The noise compensation filter 74 includes one or more instructions for determining an inverse of the channel response (or multiple channels in the situation where there are multiple noise sources) and then applying the inverse of the channel response to the corrupted channel signal. The resulting output from the noise-compensation filter represents a filtered channel signal that has been compensated for the effects of noise in the signal environment.

The channel-interference determination module 72 may optionally receive the filtered channel signal as feedback from the output of the noise-compensation filter 74. The channel-interference determination module 72 may then use the feedback to make adjustments to the channel response to enhance the effectiveness of the channel response (provided to the noise-compensation filter 74) in reducing or removing noise effects from the filtered channel signal. Such feedback may be omitted without departing from the scope of the present teachings.

The noise-canceling system 70 acts as channel equalizer in that it determines the effects of noise on the corrupted channel and incorporates such effects in a channel response. The channel response may be a transfer function that models the effects that noise and other signals in the channel or relevant signal environment have on a given signal. An inverse of the transfer function is applied to a signal (corrupted channel signal) that has passed through a channel or signal environment and has been corrupted thereby.

In the present embodiment, the inverse of the channel response, i.e., transfer function, or best approximation of multiple transfer functions, is computed in noise-compensation filter 74. Alternatively, the inverse of the channel response is determined in the channel-interference determination module 72. The inverse of the channel response may be provided to the noise-compensation filter 74 in the form of transfer function coefficients, which adjust the transfer function of the noise-compensation filter 74 as needed to eliminate or reduce noise in the corrupted channel signal.

For the purposes of the present discussion, a channel may be any signal path. An example channel is a wire or other conductor path via which a signal passes. Alternatively, a channel may refer instead to a specific band of frequencies employed to convey a signal. In this case, the channel response characterizes the effects of noise in the signal environment on the given band of frequencies via which the signal is conveyed.

A channel equalizer may be any noise-canceling device that compensates for frequency-dependent loss by passing an attenuated or corrupted signal through a filter that is designed to model the inverse response of the channel, thereby undoing the loss-induced by noise or other factors.

Figure 3:
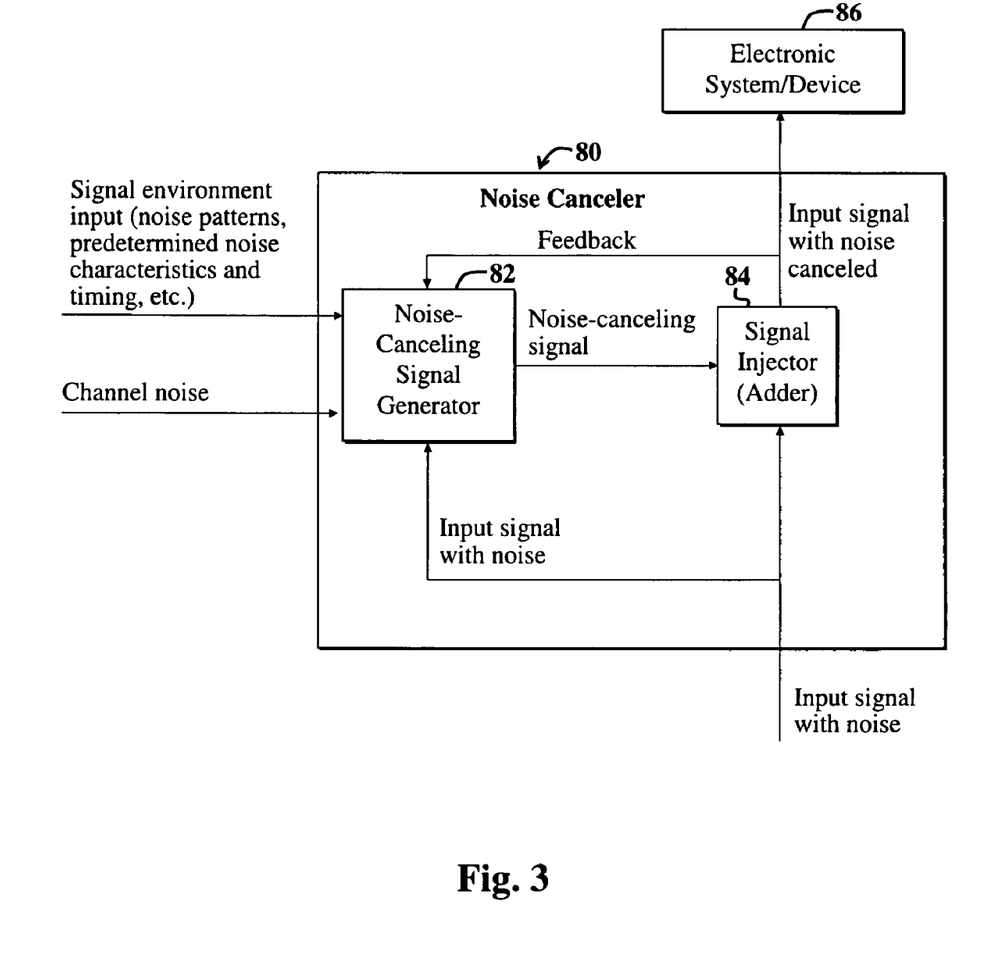
FIG. 3 illustrates a second example noise-canceling system that injects a noise-canceling signal into a signal path.

FIG. 3 illustrates a second example noise-canceling system 80 that injects a noise-canceling signal into a signal path. The noise-canceling system 80 includes a noise-canceling signal generator 82 in communication with a signal injector 84, which lies in an input signal path at an input of an electronic system or device 86.

In operation, the noise-canceling signal generator 82 measures channel noise or otherwise receives a signal indicative of channel noise and further receives an additional signal that characterizes the signal environment. The additional signal may include noise patterns and other noise characteristics. The noise-canceling signal generator 82 generates a noise-canceling signal 82 based on measured channel noise and other predetermined information pertaining to the channel noise.

The noise-canceling signal is then input to the signal injector 84, which may be implemented via a signal adder or subtracter or other device depending on the noise-canceling signal employed. The signal injector 84 couples the noise-canceling signal with an input signal that includes noise so that the noise-canceling signal destructively interferes with the noise signal in the input signal, resulting in reduction or cancellation of noise in the input signal.

For illustrative purposes, the noise-canceling signal generator 82 is also shown receiving feedback from the output of the signal injector 84 in addition to receiving an input signal with noise. Such additional signal inputs to the noise-canceling signal generator 82 may be omitted without departing from the scope of the present teachings. In the present embodiment, the noise-canceling signal generator 82 employs the additional signal inputs to monitor the effectiveness of the noise-canceling signal in canceling noise in the input signal. The additional inputs are also used to make adjustments the noise-canceling signal to further reduce noise in the input signal that is provided to the electronic device 86.

While in the present embodiment, the input to the electronic device 86 is shown as a signal line or electrical conductor path, the input may be a wireless input to the receiver of an antenna without departing from the scope of the present invention. In this case, the signal-adding or signal-subtracting function that is performed by the injector or adder 84 may occur wirelessly.

Unlike conventional noise filters, the noise-canceling system 80 may cancel or reduce wideband noise in the signal input to the electronic device 86. By dropping the noise floor at the receiver or other input of the electronic device 86, a substantial improvement in signal-to-noise ratio is achieved. If the electronic device 86 is a multi-functional wireless telephone, the resulting improvement in signal-to-noise ratio will yield fewer dropped calls and may facilitate implementing various features, such as continuous video, GPS signal acquisition, and so on.

With reference to FIGS. 1-3, the noise-canceling systems 10, 70, 80 of FIGS. 1-3 generally produce a noise-canceling signal or transfer function based in part on predetermined knowledge of the signal environment. The predetermined knowledge of the signal environment, which may be provided via a signal-environment input, may enable the systems 10, 70, 80 to be activated only when needed, thereby further minimizing power use. For example, a sensor, such as the display-activation sensor 30 of FIG. 1 may signal, milliseconds in advance, when an interference-causing display is about to be activated. The resulting signal may be employed to turn-on noise-canceling circuitry and to initialize accompanying noise-canceling modules and algorithms as needed.

As another example, a keep-alive signal or a power-control signal transmitted from a cellular base station, such as the base station 22 of FIG. 1, may periodically increase noise in a given signal environment. Performance and power consumption of noise-canceling circuitry may be improved by strategically using predetermined knowledge of when such keep-alive signals are broadcast from a base station and using predetermined knowledge of certain characteristics, such as signal intensity, of the keep-alive signals.

Improved noise predictions can be made by employing additional information about noise in a signal environment, other than merely the noise itself. In addition, such noise predictions may be employed to energize noise-canceling circuitry and initialize algorithms just before the circuitry and/or algorithms are needed.

Generally, the noise-canceling systems 10, 70, 80 converge to a desired noise-cancellation signal or signal response. Note however, that converging algorithms or closed-loop algorithms may be replaced with open loop algorithms or preset value, regardless when applied (design, manufacturing, initial power-up, test power-up, etc.) without departing from the scope of the present discussion. For example, the feedback paths in the systems 70, 80 of FIGS. 2 and 3 may be omitted, and the receiver 40 may be omitted from the noise-canceling system 10 of FIG. 1.

Various modules of the noise-canceling systems 10, 70, 80, may be implemented on a relatively small chip via analog circuits. However, other types of circuits, such as digital circuits, combinations of digital and analog circuits, software, and so on may be employed without departing from the scope of the present teachings. Implementation details of specific modules are generally application specific.

Predetermined information about undesirable signals, noise, or other signal-attenuating factors in the signal environment may affect parameters on the chip used to implement one or more of the noise-canceling systems 10, 70, 80. Such parameters, which may be preloaded on the chip. The preloaded parameters may then affect resulting noise-cancellations signals that are produced to cancel certain noise or to otherwise restore a signal that has been degraded by a signal environment, such as a channel.

Use of such parameters may improve the initial noise-cancellation signal or initial transfer function and may reduce the time required by the noise-cancellation systems 10, 70, 80 to generate a desired noise-cancellation signal or transfer function.

Figure 4:
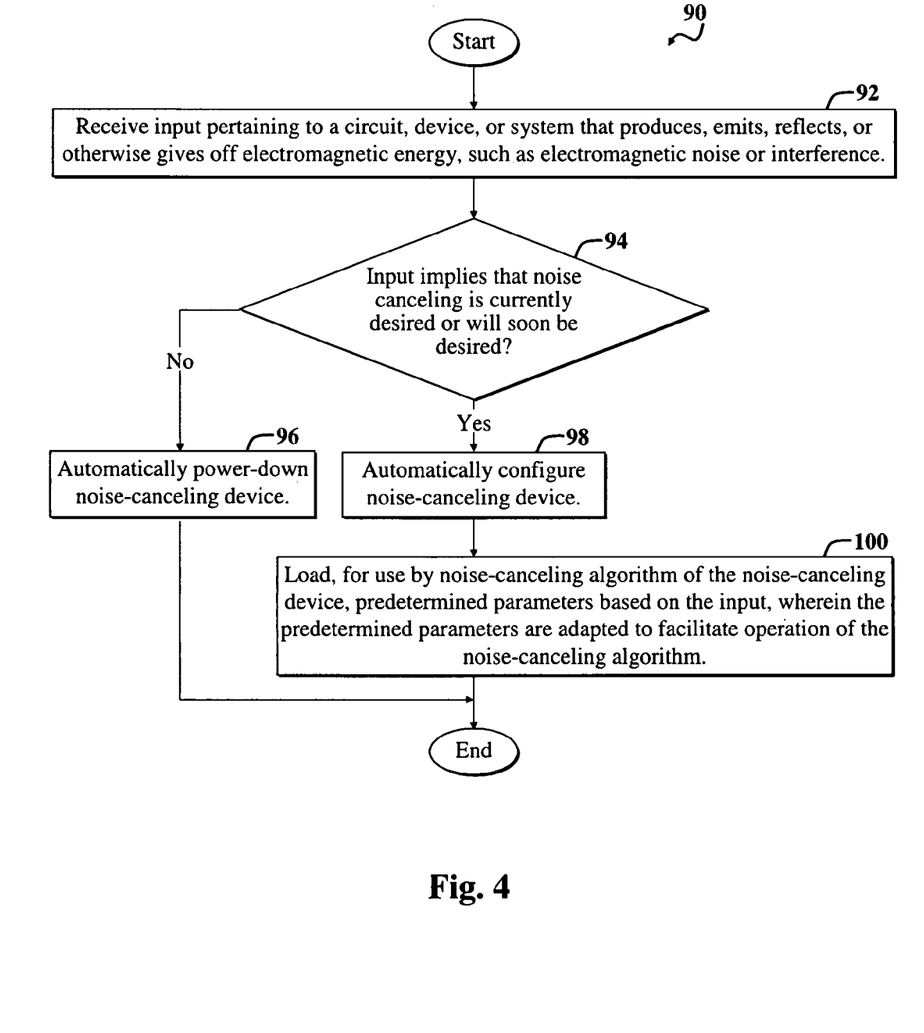
FIG. 4 a flow diagram of a first example method for facilitating canceling or reducing noise in a signal environment.

FIG. 4 a flow diagram of a first example method 90 for facilitating canceling or reducing noise in a signal environment. The method 90 includes a first step 92, which includes receiving input pertaining to a circuit, device, or system that produces, emits, reflects, or otherwise gives off electromagnetic energy, such as electromagnetic noise or interference.

Subsequently, a second step 94 determines whether the input received in the first step 92 implies that noise canceling is currently desired or will soon be desired. If noise canceling is desired, then a third step 98 is performed, wherein a noise-canceling device is automatically configured, such as by loading canceller coefficients, powering on all or a portion of the noise canceller, activating or preparing circuitry or processes in the noise canceller such as switching from a low-power to a full-power state, bringing out of standby or hibernation modes, etc. Subsequently, fourth step 100 is performed.

The fourth step 100 includes loading, for use by a noise-canceling algorithm of the noise-canceling device, predetermined parameters based on the input received in the first step 92. The predetermined parameters facilitate operation of the noise-canceling algorithm.

If noise-canceling is not desired as determined in the second step 94, and a noise-canceling device is currently powered-on, a fifth step 96 is performed. The fourth step 96 includes automatically powering-down any noise-canceling devices that are currently powered-on. Subsequently, the method 90 completes.

Figure 5:
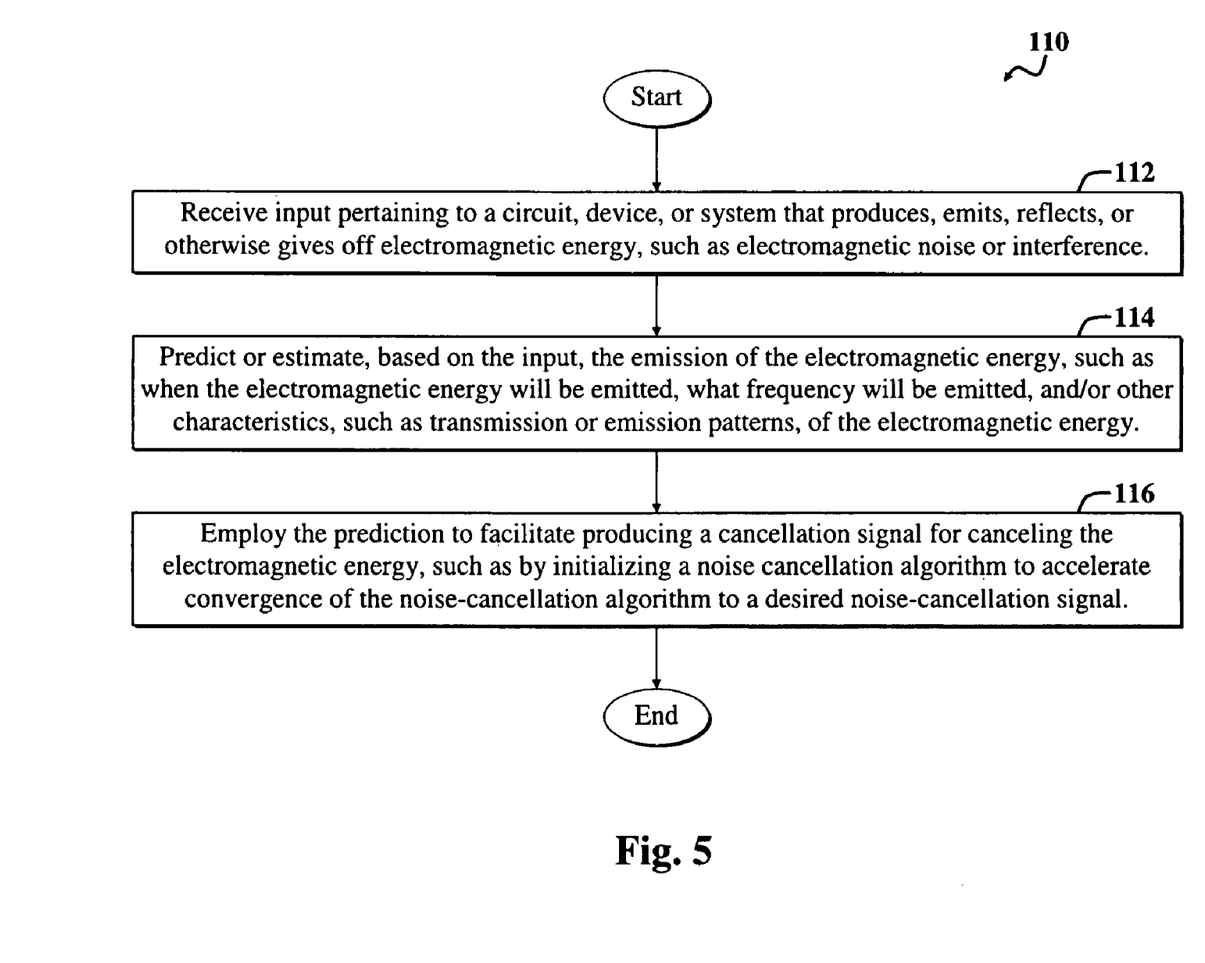
FIG. 5 is a flow diagram of a second example method for facilitating canceling or reducing noise in a signal environment.

FIG. 5 is a flow diagram of a second example method 110 for facilitating canceling or reducing noise in a signal environment. The second example method 110 includes a receiving step 112, which is similar to the first step 92 of the method 90 of FIG. 4.

Subsequently, an estimating step 114 is performed. The estimation step 114 includes predicting or estimating, based on the input, the emission of the electromagnetic energy, such as when the electromagnetic energy will be emitted, what frequency channel will be emitted, and/or other characteristics, such as transmission or emission patterns, of the electromagnetic energy.

Next, a noise-canceling step 116 is performed. The noise-canceling step 116 includes employing the prediction or estimation determined in the estimating step 114 to produce a noise-cancellation signal for canceling the electromagnetic energy. The noise-canceling step 116 may include initializing a noise cancellation algorithm of a noise-canceling device to accelerate convergence of the noise-cancellation algorithm to a desired noise-cancellation signal. Another effect that may assist in cancellation can occur if the timing of receipt of the advance signal is known relative to the arrival of the noise signal characteristic. For example, if it is known that an advance signals is received 100 mS before a noise signal impinges upon a target circuit then a cancellation signal can be generated timed so that its cancellation effect upon the noise signal at the point of the target circuit is maximized.

Although embodiments of the invention are discussed primarily with respect to systems for reducing or canceling noise in a signal environment, signal path, or device that arises from external noise sources, embodiments may be employed to cancel other types of noise without departing from the scope of the present teachings. For example, certain circuits may experience undesirable inductive coupling between conductors in the circuit. Certain embodiments discussed herein may be readily adapted to cancel or compensate for interference caused by inductive coupling or other types of signal degradation or attenuation, such as cross-talk, in a signal environment.

Arrowheads shown on signal paths between various modules are for illustrative purposes only. For example, various communication paths or connecting lines, which appear to be unidirectional in the drawings, may be bidirectional without departing from the scope of the present invention.

Although a process of embodiments discussed herein may be presented as a single entity, such as software or hardware executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a convergence algorithm, a controller, and a noise-pattern analyzer can be executing in a single module, or in different modules.

Although the invention has been discussed with respect to specific example embodiments thereof, these embodiments are merely illustrative, and not restrictive, of the invention. In the description herein, numerous specific details are provided, such as examples of components and/or methods, to provide a thorough understanding of discussed example embodiments. One skilled in the relevant art will recognize, however, that certain embodiments can be practiced without one or more of the specific details, or with other apparatus, systems, assemblies, methods, components, materials, parts, and/or the like. In other instances, well-known structures, materials, or operations are not specifically shown or described in detail to avoid obscuring aspects of the example embodiments discussed herein.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an example embodiment", or "a specific embodiment" means that a particular feature, structure, or characteristic described in connection with the embodiment not necessarily included in all possible example embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment or example embodiment discussed herein may be combined in any suitable manner with one or more other embodiments. It is to be understood that other variations and modifications of the embodiments described and illustrated herein are possible in light of the teachings herein, and the variations are to be considered as part of the spirit and scope of the present invention.

Example embodiments discussed herein may be implemented in whole or in part by using a programmed general purpose digital computer; by using application specific integrated circuits, programmable logic devices, optical, chemical, biological, quantum or nanoengineered systems or mechanisms; and so on. In general, the functions of various embodiments can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated example embodiments, including what is described in the Abstract, is not intended to be exhaustive or to limit the invention to the precise forms disclosed herein. While certain example embodiments are described herein for illustrative purposes only, various equivalent modifications are possible within the spirit and scope of the present invention, as those skilled in the relevant art will recognize and appreciate. As indicated, these modifications may be made in light of the foregoing description of illustrated example embodiments and are to be included within the spirit and scope of the present invention.

Thus, while example embodiments have been described herein, a latitude of modification, various changes and substitutions are intended in the foregoing disclosures, and it will be appreciated that in some instances some features of embodiments will be employed without a corresponding use of other features without departing from the scope and spirit of the invention. Therefore, many modifications may be made to adapt a particular situation or material to the essential scope and spirit of the present invention. It is intended that the invention not be limited to the particular terms used in following claims and/or to a particular embodiment disclosed as the best mode contemplated for carrying out this invention, but that the invention will include any and all embodiments and equivalents falling within the scope of the appended claims.

What is claimed is:

1. An apparatus to cancel a noise signal characteristic that interferes with a target circuit, the apparatus comprising:
    a pre-configuration mechanism configured to receive an advance signal from a sensor adapted to detect a future occurrence of a noise signal and, responsive to receiving the advance signal, generate a pre-configuration signal based on the advance signal, the advance signal indicating the future occurrence of the noise signal and comprising the noise signal characteristic; and
    a noise canceling circuit configured to receive the pre-configuration signal and selectively trigger a power of one or more modules of the noise canceling circuit based on the pre-configuration signal.

2. The apparatus of claim 1, wherein the noise signal characteristic includes an indication of energy in the noise signal.

3. The apparatus of claim 1, wherein the noise signal characteristic includes an indication of a phase of the noise signal.

4. The apparatus of claim 1, wherein the noise signal characteristic includes an indication of a frequency of the noise signal.

5. The apparatus of claim 1, wherein the noise signal characteristic includes an indication of an associated channel.

6. The apparatus of claim 1, wherein the noise signal characteristic includes an indication of an amplitude of the noise signal.

7. The apparatus of claim 1, wherein the noise signal characteristic includes an indication of a delay of the noise signal.

8. The apparatus of claim 7, wherein the advance signal indicates a periodic signal between a mobile phone and a base station.

9. The apparatus of claim 1, wherein the advance signal is derived from a clock signal.

10. The apparatus of claim 9, wherein the advance signal is generated periodically at known intervals to correspond with a periodic behavior of the noise signal.

11. The apparatus of claim 1, wherein the advance signal includes an indication of a predicted change in a radiation pattern of a mobile communication device when the mobile communication device is handled by a user.

12. The apparatus of claim 1, wherein the advance signal includes an indication that a noise source will be activated.

13. The apparatus of claim 1, wherein the advance signal includes an indication that an energy emission of a display screen will change.

14. The apparatus of claim 1, wherein the pre-configuration mechanism includes one or more coefficients used in a noise canceling process.

15. The apparatus of claim 14, wherein one or more of the coefficients are provided for use by the noise canceling process in advance of the noise signal interference on the target circuit.

16. The apparatus of claim 15, wherein at least one coefficient is learned by analyzing prior performance of the noise signal characteristic.

17. The apparatus of claim 1, wherein the pre-configuration mechanism provides an indication of an expected time when the noise signal characteristic will affect the target circuit.

18. The apparatus of claim 1, wherein
the power of one or more modules of the noise canceling circuit is triggered based on the characteristic of the noise signal indicated by the advance signal, and
the noise canceling circuit is further configured to power-on and a power-off the one or more modules of the noise canceling circuit based on the pre-configuration signal.

19. The method of claim 1, wherein the pre-configuration signal comprises at least one of a characteristic of the noise signal and predictive information that assists the noise canceling circuit to estimate a change in characteristic of the noise signal in the signal environment with respect to time.

20. An apparatus comprising:
a pre-configuration module configured to receive an advance signal from a sensor prior to the transmission of a noise signal in the signal environment, the advance signal indicating a future occurrence of the noise signal and comprising a noise signal characteristic;
a noise pattern analyzer configured to analyze the advance signal and generate a prediction of change in a characteristic of the noise signal with respect to time; and
a noise canceling circuit configured to receive the prediction and comprising a controller configured to, in response to receiving the prediction, pre-configure the noise canceling circuit and selectively trigger a power of one or more modules of the noise canceling circuit based on the characteristic of the noise signal.

21. The apparatus of claim 20, wherein the noise canceling circuit uses coefficient parameters to converge on a cancellation signal, the apparatus further comprising:
means to accelerate convergence by pre-loading one or more coefficient parameters in response to at least one of the advance signal and the prediction.

22. A method for reducing an effect of electromagnetic energy, the method comprising:
receiving, by a noise canceling circuit, an input signal that indicates a characteristic of electromagnetic energy before the characteristic of electromagnetic energy affects a target circuit;
responsive to the input signal, selectively triggering, by the noise canceling circuit, a power of one or more modules of the noise canceling circuit based on the characteristic of the electromagnetic energy, triggering the power comprising at least one of powering-on and powering-off the one or more modules; and
producing, by the noise canceling circuit, a cancellation signal for canceling an effect of the characteristic of electromagnetic energy on the target circuit.

23. The method of claim 22, wherein the characteristic includes a time at which the electromagnetic energy will be emitted.

24. The method of claim 22, wherein the characteristic includes one or more of a phase, amplitude or frequency of the electromagnetic energy.

25. The method of claim 22, further comprising:
pre-configuring, by the noise canceling circuit, a noise cancellation algorithm to accelerate convergence of the noise-cancellation algorithm to produce the cancellation signal.

26. An apparatus for indicating an electromagnetic emission, the apparatus comprising:
a first mechanism to determine a change in a characteristic of an electromagnetic emission in advance of the change in the characteristic and generate a first signal in response to the determined change; and
a second mechanism to, based on the first signal, selectively trigger a power of a module associated with a convergence algorithm and pre-configure to generate a noise canceling signal to reduce an effect of the change in the characteristic on a target circuit.

27. A method for indicating an electromagnetic emission, the method comprising:
sending, by a pre-configuration module, a signal in advance of a change in a characteristic of an electromagnetic emission;
pre-configuring, by a noise canceling circuit, an algorithm to reduce an effect of the change in the characteristic on a target circuit based on the signal;
selectively triggering, by the noise canceling circuit, a power of one or more modules of the noise canceling circuit based on the signal; and
generating, by the noise canceling circuit, a noise canceling signal based on the electromagnetic emission and the input signal, to cancel at least a portion of the electromagnetic emission.

28. A computer-readable storage device storing computer-readable instructions thereon that, when executed by a processor, directs the processor to perform a method for controlling a noise canceling circuit to cancel a noise signal characteristic that interferes with a target circuit, the method comprising:
receiving, by a noise canceling circuit, an input signal that indicates a characteristic of electromagnetic energy before the characteristic of electromagnetic energy affects a target circuit;
responsive to the input signal, selectively triggering, by the noise canceling circuit, a power of one or more modules of the noise canceling circuit based on the characteristic of the electromagnetic energy, triggering the power comprising at least one of powering-on and powering-off the one or more modules; and
producing, by the noise canceling circuit, a cancellation signal for canceling an effect of the characteristic of electromagnetic energy on the target circuit.

29. The apparatus of claim 28, wherein the characteristic includes a time at which the electromagnetic energy will be emitted.

30. The apparatus of claim 28, wherein the characteristic includes one or more of a phase, amplitude or frequency of the electromagnetic energy.

* * * * *